United States Patent [19]

Bachand et al.

[11] Patent Number: 5,695,385

[45] Date of Patent: Dec. 9, 1997

[54] RECYCLABLE ABRASIVE BLASTING SYSTEM AND METHOD

[75] Inventors: David P. Bachand, Plantsville, Conn.; Gerald P. McNamara, Warwick, R.I.

[73] Assignee: IPEC, LLC, Concord, Mass.

[21] Appl. No.: 561,043

[22] Filed: Nov. 20, 1995

Related U.S. Application Data

[63] Continuation of Ser. No. 156,403, Nov. 19, 1993, Pat. No. 5,468,174, which is a continuation of Ser. No. 976,495, Nov. 13, 1992, abandoned.

[51] Int. Cl.$^6$ .................. B24C 1/08; B24C 3/06; B24C 9/00
[52] U.S. Cl. .................. 451/38; 451/39; 451/60; 451/88; 451/92; 451/99; 451/100
[58] Field of Search .................. 451/38, 40, 60, 451/75, 87, 88, 90, 91, 92, 99, 100, 39, 446

[56] References Cited

U.S. PATENT DOCUMENTS

| | | |
|---|---|---|
| 4,693,041 | 9/1987 | Dickson . |
| 4,753,052 | 6/1988 | Dickson . |
| 4,773,189 | 9/1988 | MacMillan et al. . |
| 4,788,799 | 12/1988 | Dickson . |
| 4,791,575 | 12/1988 | Watts et al. . |
| 4,827,678 | 5/1989 | MacMillan . |
| 4,866,889 | 9/1989 | Goldmann . |
| 4,887,221 | 12/1989 | Davis et al. . |
| 4,993,200 | 2/1991 | Morioka et al. . |
| 5,035,089 | 7/1991 | Tillman et al. . |
| 5,056,275 | 10/1991 | Wada . |
| 5,063,713 | 11/1991 | Buchheit . |
| 5,071,541 | 12/1991 | Thompson . |
| 5,090,162 | 2/1992 | Nelson . |
| 5,107,630 | 4/1992 | Lodewijk . |
| 5,134,810 | 8/1992 | Carpenter . |
| 5,134,811 | 8/1992 | Enegren . |
| 5,161,336 | 11/1992 | Ritt . |
| 5,161,337 | 11/1992 | Swain . |

FOREIGN PATENT DOCUMENTS

| | | |
|---|---|---|
| 0274783 | 7/1988 | European Pat. Off. . |
| 1539571 | 10/1976 | United Kingdom . |

*Primary Examiner*—Timothy V. Eley
*Attorney, Agent, or Firm*—Lorusso & Loud

[57] ABSTRACT

A method of using a recyclable abrasive blasting system for blasting abrasive against a surface to be cleaned and for recovering such abrasive, comprising a storage hopper for containing abrasive, blast pots which receive abrasive and deliver it to a blasting hose, an autodump tank including an inlet for receiving particles resulting from blasting, such particles comprising trash, debris, dust and abrasive, a screen for separating trash and debris from the particles, an airwash for separating dust from said particles, and values for metering the amount of particles traveling there-through, a classifier includes a first auger and a plurality of augers formed by screens having spiral members thereon, the plurality of augers surrounding the first auger and in rotating cooperation therewith, whereby the screens classify debris from abrasive such that it may be routed outside of the classifier, whereby an airwash takes place and wherein any remaining particles travel to a particle separator having accumulating plates in cooperation with a hinged rod for creating a curtain of particles, and a blower for separating abrasive from debris in the curtain of particles and routing the abrasive to be stored in a storage hopper.

27 Claims, 13 Drawing Sheets

RECYCLABLE ABRASIVE BLASTING SYSTEM AND METHOD

This is a continuation of application Ser. No. 08/156,403, filed Nov. 19, 1993 now U.S. Pat. No. 5,468,174, which is a continuation of Ser. No. 07/976,495, filed on Nov. 13, 1992, now abandoned, the teachings of which are hereby incorported by reference.

BACKGROUND OF THE INVENTION

1. Field of the Invention

This invention relates to a closed loop system wherein abrasive is blasted against a surface to be cleaned and is then recovered for reuse in the system, through the use of means for removing trash, debris, dust therefrom.

2. Brief Description of the Prior Art

Surface blasting recovery systems of the prior art have failed to provide adequate separation of trash, debris and dust from the abrasive employed therein. Since the abrasive is ultimately sent back to a blasting apparatus for reuse, it is imperative that it be free of such foreign matter. Many problems may result from the failure to adequately perform such separation. Clogging of system components and increased wear and tear on the blasting mechanisms are but a few of such problems. Moreover, the health of the user may be endangered if dust is permitted to remain with the recycled abrasive during blasting, or if dust is not separated from the debris prior to disposal.

In failing to recognize the importance of metering the input material to be recovered as an aid in classification, many prior art systems have attempted to separate debris from abrasive in great amounts. The intake portions of such systems are usually large and the walls thereof are configured such that abrasives and foreign matter generated by the blasting process, impinge thereon. Although such inlets may function to decrease the kinetic energy of the recovered materials, the volume of materials entering the system makes difficult the later classification thereof. This problem is common to the systems described in U.S. Pat. Nos. 4,693,041, 4,753,052, 4,788,799 and 5,090,162.

In one of these systems, that described in U.S. Pat. No. 4,693,041, abrasive is separated from dust via magnetic members and a single filter screen. Air flow is such that dust and debris are carried past the magnetic members. However, the likelihood of debris remaining with abrasive is high when recovered in large amounts, since debris will impinge on the magnetic members due to the large volume of air laden debris traveling therethrough. Thus, a large portion of the debris traveling through the system may lose kinetic energy after impinging on the magnetic members, only to fall through a filter screen and remain with the abrasive.

Additionally, In U.S. Pat. No. 5,090,162 a blasting apparatus is disclosed wherein the mixture of abrasive material, dust and debris are collected through a rebound corridor. Dust and debris are separated by passing the mixture through funnels wherein lighter particles are separated from heavier ones due to air flow. Should heavy debris be collected, however, it is unlikely that this system would work effectively, as such debris would have a tendency to remain with the heavy abrasive, thereby contaminating it.

Despite the absence of means for metering incoming particles, many systems do not have classifiers which can adequately separate large or heavy matter from the blasting abrasive. An example of such is the system of Published European Patent Application No. 0274783. This system is of limited application, as such could not be used to clean a structure wherein large particles would be created. Separation of large particles from the abrasive could not occur in this system because large particles would remain on the sieve and eventually clog the system.

Similarly, in GB-1539571 a separator is disclosed wherein a high pressure blower is employed to separate abrasive material from dust and debris. The potential for a great deal of debris and dust remaining with the recovered abrasive exists due to the absence of a material classifier. This separation system will not be able to distinguish between heavy debris and abrasive shot, as this system is dependent solely on the abrasive shot being heavier than debris for effective separation to occur.

In those systems where classification does occur, many of the classifiers are inadequate. In U.S. Pat. No. 4,773,189 a separation system is disclosed wherein polymeric material is separated from debris and dust through a series of screens. However, any heavy debris which is not separated by the screens will be contained with the polymeric material in the storage hopper, and potentially fed back to the blaster.

The failure to adequately separate debris from dust after abrasive has been separated therefrom, has been a problem inadequately dealt with in the prior art. In many systems, both dust and debris are disposed of together, such as in the systems above and in the systems disclosed in U.S. Pat. Nos. 4,993,200, and 5,134,810. In U.S. Pat. No. 4,993,200 a blasting apparatus is disclosed wherein dust and debris are separated from abrasive by a classifier. However, in these systems the dust and debris are not separated from one another. Thus, upon the disposal thereof, dust comprising undesirable contaminants is permitted to escape into the air and causes damage to the environment. In U.S. Pat. No. 5,134,810 disclosed is an abrasive cleaning machine wherein abrasive particles are recovered from a mixture solely through the use of vacuums. However, no classification of debris or separation of dust therefrom, takes place, as both are disposed of together.

Some prior art systems have developed means for containing dust separately. However, dust is usually only separated and accumulated once throughout the system and is never a further concern. Thus, upon the final separation of debris from the abrasive, often there is a great deal of accompanying dust which is neither recovered nor contained. An example of systems in which such a problem exists is U.S. Pat. No. 5,035,089 and Published European Patent Application No. 0274783.

In U.S. Pat. No. 5,035,089 a blast media recovery system is disclosed wherein dust is initially separated from debris and abrasive. However, problems associated with dust remaining with the mixture of debris and abrasive, is not alleviated by the later separation of debris from abrasive, carried out by a multi-screen separator. Thus, such uncontained dust leads to problems of contamination of the abrasive which may result in ineffective cleaning, as well as damage to the environment and endangerment of the health of the user. A similar abrasive blasting apparatus is disclosed in Published European Patent Application No. 0274783. The recovered abrasive is separated from dust via baffle plates and a screening sieve. Dust is initially separated from the abrasive and sent to a dust collector. Whatever dust is not recovered is then allowed to remain with the abrasive for reuse.

The present invention overcomes all of the above inadequacies of the prior art and provides a system wherein particles comprising abrasive, trash, debris and dust are received from the blasting area, and applied to a novel multistage screening and airwash system. The abrasive is ultimately recycled for reuse is free trash, debris and dust, each of which are disposed of separately.

SUMMARY OF THE INVENTION

It is therefore, an object of the present invention to separate and classify debris and dust from abrasive so that the abrasive can be reused.

It is an additional object of the invention to contain the dust associated with surface blasting so as to protect the environment and the health of the user.

It is an additional object of the invention to provide computerized access to the operating state of system elements so as to enable the user to activate, deactive and monitor such elements.

These and other objects of the invention are achieved by a multi-phase system for separating abrasive from debris and dust comprising; a blasting nozzle which communicates with blast pots for blasting abrasive against a surface to be cleaned, a vacuum for aspirating particles from a surface being cleaned by abrasive, an autodump tank including an inlet for receiving particles, a screen for separating trash and debris from the particles and an outlet for the exit thereof, an outlet for performing an airwash to separate dust from the particles, and means for metering the particles traveling through the autodump tank, a bucket elevator including an inlet for receiving particles and a passageway for transportation of particles, along with means for performing a second airwash, and a classifier, whereby the classifier includes a first auger and a plurality of augers, wherein the plurality of augers are formed by screens having spiral members thereon which rotatingly cooperate with the first auger to provide an even distribution of particles, wherein the screens separate debris from abrasive such that it may be routed outside of the classifier, wherein a third airwash occurs therein while any remaining particles travel to a particle separator, whereby the particle separator includes a plate in cooperation with a hinged rod for creating a curtain of particles, and a blower for creating a partial vacuum for performing a final separation of debris and dust from abrasive, wherein the particle separator has means for routing the abrasive to be stored, and a plurality of outlets for routing debris and dust from the system, wherein a last airwash is performed which separates dust from abrasive. With each airwash, dust is removed and accumulated in dust collectors. A dust evacuator may be employed to remove dust from the dust collectors in the system to a location external of the blasting system, so as to further safeguard the safety of the user, by keeping the user free from contaminated particles. The abrasive which has been separated and recovered may be sent to storage bins or reloaded into a storage hopper via a bucket elevator or a conventional conveying means, which then delivers abrasive to blast pots.

Lastly, a computerized touchscreen is provided, wherein a main control panel permits the user may activate and deactivate, the blasting of abrasive against a surface to be cleaned, and the vacuuming and separation/classification of abrasive and debris accumulated as a result of the blasting. Additionally, the user may access other touchscreens from this panel which allow the user to monitor the activity of each of the individual system elements.

BRIEF DESCRIPTION OF THE DRAWING

FIGS. 6C-2 through 6C-9 are views of the other touchscreens which are accessible via the system monitoring touchscreen.

DESCRIPTION OF THE PREFERRED EMBODIMENT

Figure 1A:
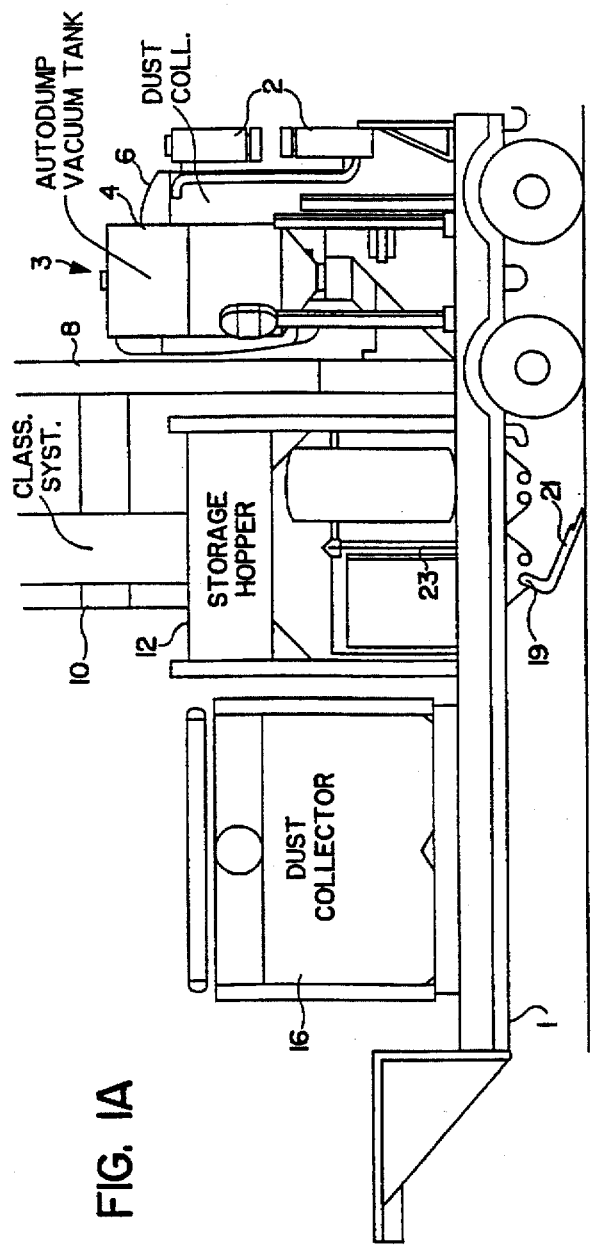
FIG. 1A isafront elevational view of the recyclable abrasive blasting system.
Figure 1B:
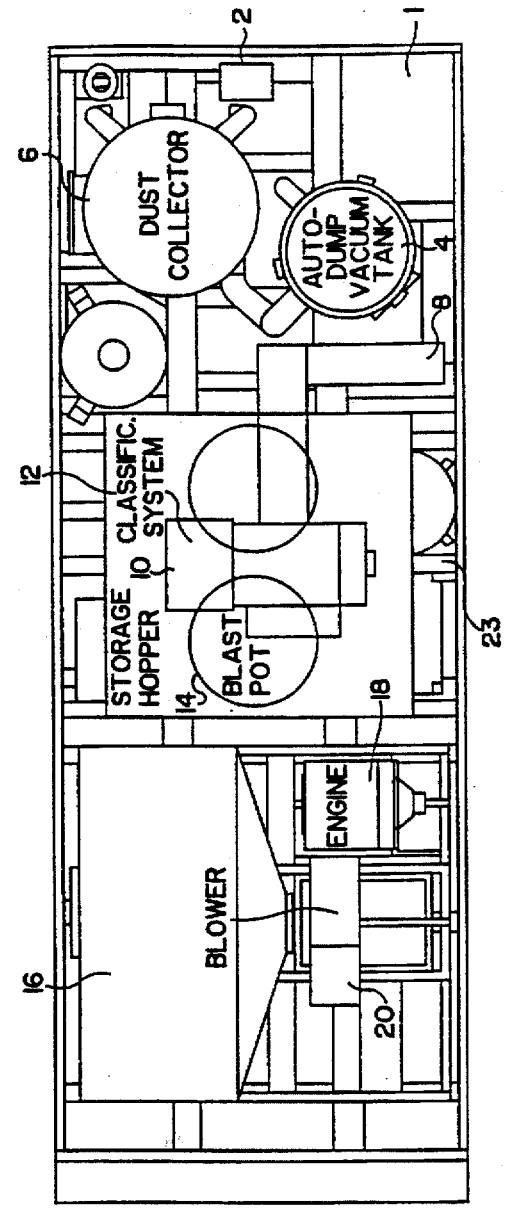
FIG. 1B is a plan view of the recyclable abrasive blasting system.

FIG. 1A is a front elevational view and FIG. 1B is a plan view of the recyclable abrasive blasting system of the present invention. A trailer 1 is responsible for supporting system elements. The primary element in the system is the autodump vacuum tank 4 which continuously receives vacuumed particles from the blasting area. These particles commonly comprise abrasive and foreign matter such as debris and dust. Jet vacuum assembly 2 maintains a constant vacuum in the autodump vacuum tank 4 such that particles will continually enter therein, either through a vacuum nozzle or other conventional inlet which aspirates particles from a surface being cleaned by abrasive.

As known in the art, other suitable systems for creating a vacuum may be used as an alternative to jet vacuum assembly 2 including, for example, a positive displacement blower or a turbine vacuum system.

The multi-phase classification system 3 comprises autodump vacuum tank 4, bucket elevator 8 and the classification system 10. A first airwash is carried out in the autodump vacuum tank 4 through the dust collector 6, which creates a cyclone in the upper portion of the tank thereby separating dust from the vacuumed particles. Additionally, a first screening is performed in the autodump tank 4 to remove large particles such as trash.

Bucket elevator 8 is a long passageway which receives remaining particles from the autodump vacuum tank 4 and routes them to the classification system 10. During the travel of the particles through the bucket elevator 8 a second airwash is performed thereon. While in the classification system 10, a second screening along with a series of airwashes are performed on the remaining particles, thereby separating heavy debris and dust from the particles recovered.

A second dust collector 16, powered by engine 18, contains any dust recovered from blasting and discharges clean air into the atmosphere, while blower 20 aids the classification system 10, by creating a partial vacuum resulting in a final separation of debris and dust from abrasive. Abrasive storage hopper 12, receives the recycled abrasive via an inlet (not shown) from the classification system 10.

The abrasive retained therein is then fed to blast pots 14. Located at the base of blast pots 14 are inlets 19 for connecting blast hose assemblies 21 which are hoses which may be several hundred feet long, equipped with blasting mechanisms such as conventional blasting nozzles and the like, which serve to propel the abrasive toward a surface being cleaned. A compressed air drying system 23 enables blasting to take place by supplying clean dry air to the blast pots 14.

Figure 2:
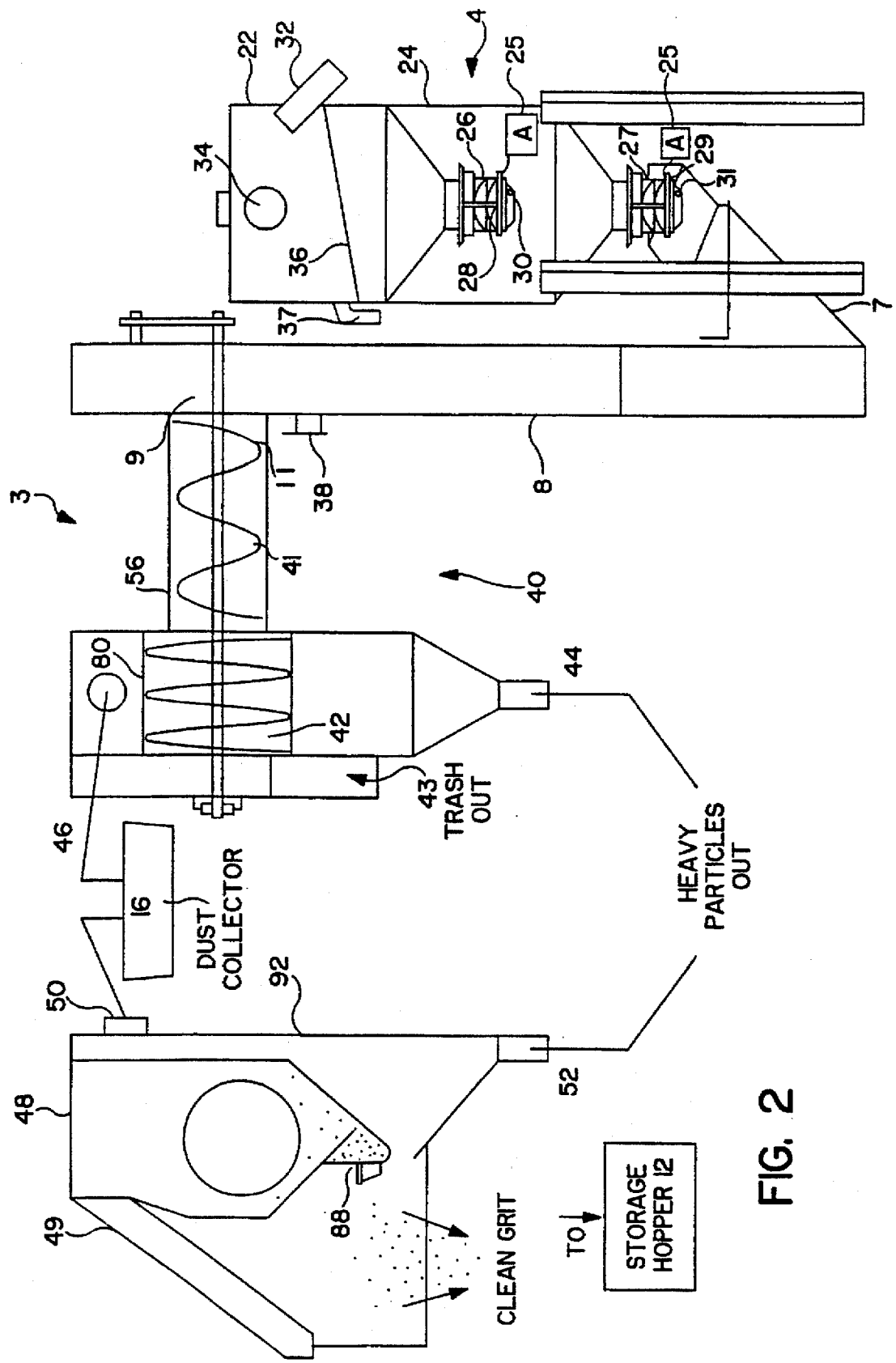
FIG. 2 is a front elevational view of the multi-phase separation system.

FIG. 2 shows a front elevational view of the multi-phase classification system 3. Autodump vacuum tank 4 comprises two funnel shaped chambers 22, 24 with valves 26, 27 at the outlets thereof. Valve 26 has a port 28 that is connected to an actuator 25 and another port 30 that is connected to vacuum assembly 2 (FIGS. 1A and 1B). Valve 27 has a port 29 that is also connected to the actuator 25 and another port 31 that is intermittently vented to the atmosphere. Actuator 25 is responsible for the intermittent opening and closing of valves 26, 27 during preset time intervals. At the upper portion of the first chamber 22 there is an inlet 32 for accepting incoming particles which are being vacuumed from a blasting area. The incoming particles commonly comprise abrasive, trash, heavy foreign particles, smaller foreign particles and dust.

The first phase of separation occurs at the upper portion of the first chamber 22 wherein an outlet 34 is connected to an autodump vacuum dust collector 6. The autodump vacuum dust collector 6 causes a cyclone airwash to take place in the first chamber 22. Thus, lighter dust particles are removed from the incoming particles for containment in the dust collector 6. In the middle portion of this chamber 22, a screen 36 separates trash and heavy particles from the incoming particles. The particles which are recovered on the screen 36 are discharged through a trash chute 37 for disposal. The incoming particles which have passed through screen 36 continue to travel through chamber 22 to chamber 24 in metered amounts.

Valves 26 and 27 in chambers 22 and 24 respectively, operate such that a continuous vacuum is maintained in the system. Chamber 22 is continually under a negative pressure and chamber 24 is intermittently at atmospheric pressure and at a negative pressure, depending on whether port 31 is open or closed, respectively. Thus, when the particles are vacuumed from an area of blasting and enter the system via inlet 32 to the first chamber 22, valve 26 opens to allow the particles to flow to chamber 24. Valve 27 is initially closed, however, thus permitting no particles to enter bucket elevator 8. At this point, port 31, of valve 27 is closed to atmosphere, as a negative pressure must exist within chamber 24 so that the particles will continue to be drawn into both chambers 22, 24. Once a certain amount of time has elapsed wherein a sufficient amount of vacuumed particles are contained in the chambers 22, 24, valve 26 closes so as to terminate communication between tank 22 and 24, and port 31 of valve 27 is vented to a=atmosphere. Valve 27 then opens to allow the particles in tank 24 to be subjected to gravitational pull therethrough. Valve 27 is open for a sufficient amount of time to allow the particles to travel down to the inlet 7 of bucket elevator 8. When the particles have escaped chamber 24, valve 27 is closed and port 31 is once again closed also so that the pressure within the chamber 24 returns to a negative pressure. A this point, valve 26 then reopens so that communication is reestablished between the chambers 22 and 24. After a certain amount of time when the particles have entered chamber 24, the process repeats itself and particles are discharged again through valve 27 into the inlet 7 of bucket elevator 8. Thus a metering of incoming particles into the bucket elevator 8 and the classification system 10 occurs as a result.

Upon travel of the particles into the bucket elevator 8, a negative pressure exerts a pull on the particles towards the classification system 10. During travel in the bucket elevator 8, a second airwash takes place. Outlet 38 is connected to the dust collector 16 which again permits recovery of dust from the particles that are traveling therethrough. Upon reaching the outlet 9 of the bucket elevator, the particles travel to the classification system 10 wherein the second and third phases of particle separation occurs.

Classification system 10 consists of a classifier 40 and a particle separator 48. The classifier. 40 has a housing 56 containing an auger 41 and a triple screening system 42 for separating debris from abrasive, which is described in greater detail in FIG. 3. Particles enter the classifier 40 through inlet 11, and are guided by auger 41 to pass through the triple screening system 42 whereby any leftover trash and/or heavy particles remaining with the incoming particles will be separated from abrasive therein. Disposal of this leftover trash is carried out through trash chute 43, while other heavy particles, such as paint chips, for example will be separated and disposed through heavy particle chute 44.

A third airwash also takes place at this time in the classifier 40. Outlet 46 is connected to the second dust collector 16 which removes dust via the negative pressure therein.

After passing through the classifier 40, the remaining particles may still contain debris and dust intermixed with the abrasive. These particles will then be sent to the particle separator 48, which is the third and final phase of separation which will be described in greater detail in FIG. 4. Although the particle separator 48 is shown in FIG. 2 in an exploded view, in operation, it is located directly beneath the classifier 40 to receive particles therefrom.

The particle separator 48 has a housing 92 which contains accumulating plates 86, 87 which are disposed in relation to a hinged support rod 88. The hinged support rod 88 cooperates with plates 86, 87 to cause the remaining particles to flow in a vertical curtain. A blower 20 creates a partial vacuum, resulting in air flow across the vertical curtain which results in a final separation of debris and dust from the abrasive. The debris and dust are further separated from one another by the pull that the dust collector 16 has on the remaining dust. Thus, the dust exits the particle separator 48 through outlet 50 to dust collector 16 and the debris exits through chute 52. At this point, clean abrasive is the only type of particle remaining and is directed to the storage hopper 12 (FIG. 1A) for later use in blast pots 14 (FIG. 1B). Alternatively, the clean abrasive may be stored for later reuse in an external tub or bin (not shown).

Figure 3:
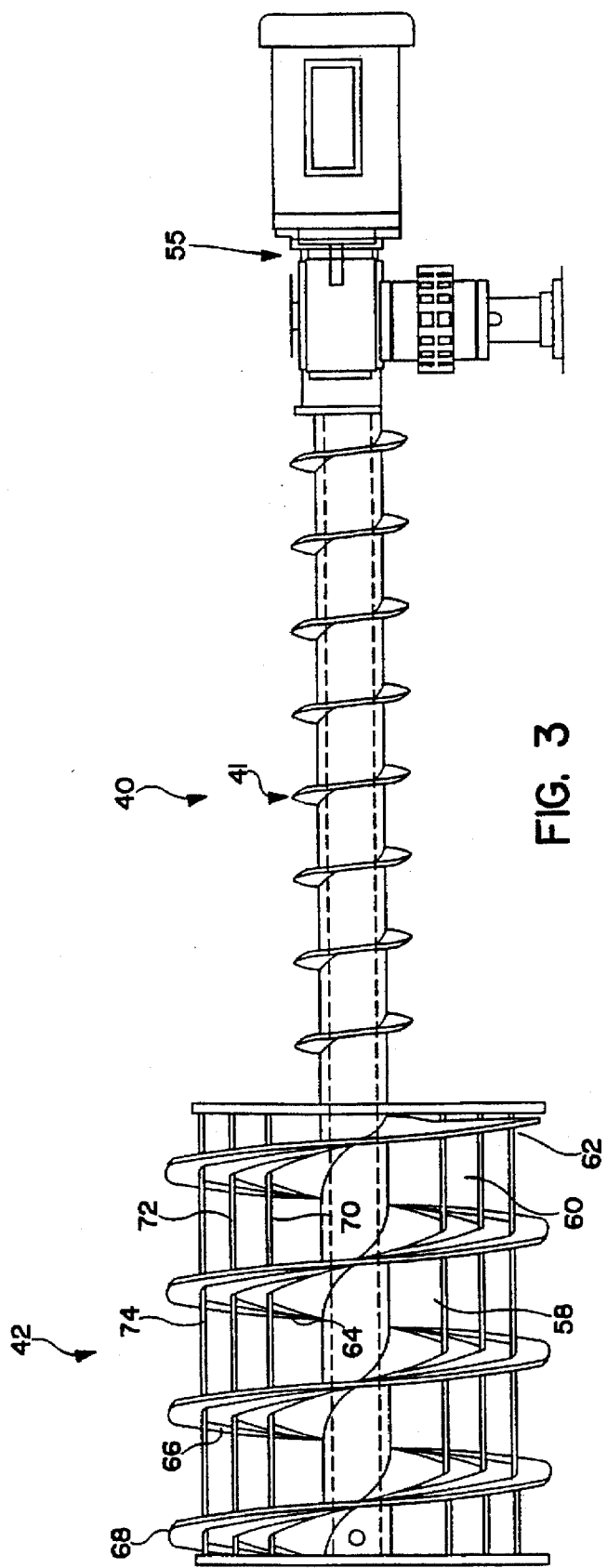
FIG. 3 is a front elevational view of the classifier.

FIG. 3 shows the classifier 40 in greater detail. An auger 41 is driven by motor 55 to guide the particles through housing 56 (FIG. 2) to the triple screening system 42. The triple screening system 42 comprises three augers 58, 60, 62 formed by spiral members 64, 66, 68 welded to three circular meshes 70, 72, 74 contained within housing 80 (FIG. 2). The spiral members 64, 66, 68 may be attached by any other suitable means known in the prior art. The meshes 70, 72, 74 can. be of any desirable micron depending on the user's needs.

The four augers 41, 58, 60, 62 are concentrically disposed, in that each auger is circularly encased by another auger, the exception being the uppermost auger 62. Each auger is continually rotated as the first auger 41 is rotated thereby providing an extremely thorough classification of particles. The use of spiral members 64, 66, and 68 are very important to this system, as they maintain an even density of particles throughout the area of the classifier 40, while advancing the circulation of particles through the housing. Moreover, the external spiral member 68, which is on the outside of mesh 74, provides an even particle density to the particle separator 48, as the use-of an external spiral member 68 prevents particles from simply lumping up in one area as they approach the housing 92 (FIGS. 2 and 4) of the particle separator 48. Thus, the particles impinge and evenly collect in the particle separator 48.

Classification of particles is such that large and/or heavy particles and trash are separated by way of first auger 58 which advantageously possesses the largest micron mesh 70. Upon separation and containment of such particles in mesh 70, spiral members 64, 66, and 68, advance such particles toward t the end of housing 80 where trash chute 43 lies. The constant rotation of the triple screening system 42 causes particles of smaller sizes, such as debris and dust, to travel through this mesh 70 and land in the next mesh 72 for possible containment therein, depending on the micron size of the mesh 72. This mesh 72 will advantageously be of a smaller micron than mesh 70 so as to contain particles of less weight and size than mesh 70. Particles not contained by this mesh will travel through it for possible trapping by the next auger 62 in mesh 74, which will advantageously be of a smaller micron than mesh 72. Particles contained in meshes 72 and 74 will travel via spiral members 66 and 68 to heavy particle chute 44. Particles not trapped in the last mesh 74, if they are very fine will travel to outlet 76 and on to the dust collector 16. Any remaining heavy particles contained with the abrasive, will continue to travel to the third phase of separation to particle separator 48. The classifier 40 can be modified for the users separation needs, such that the size of the mesh may be vary in accordance with the size and weight of the particles desired to be recovered.

Figure 4:
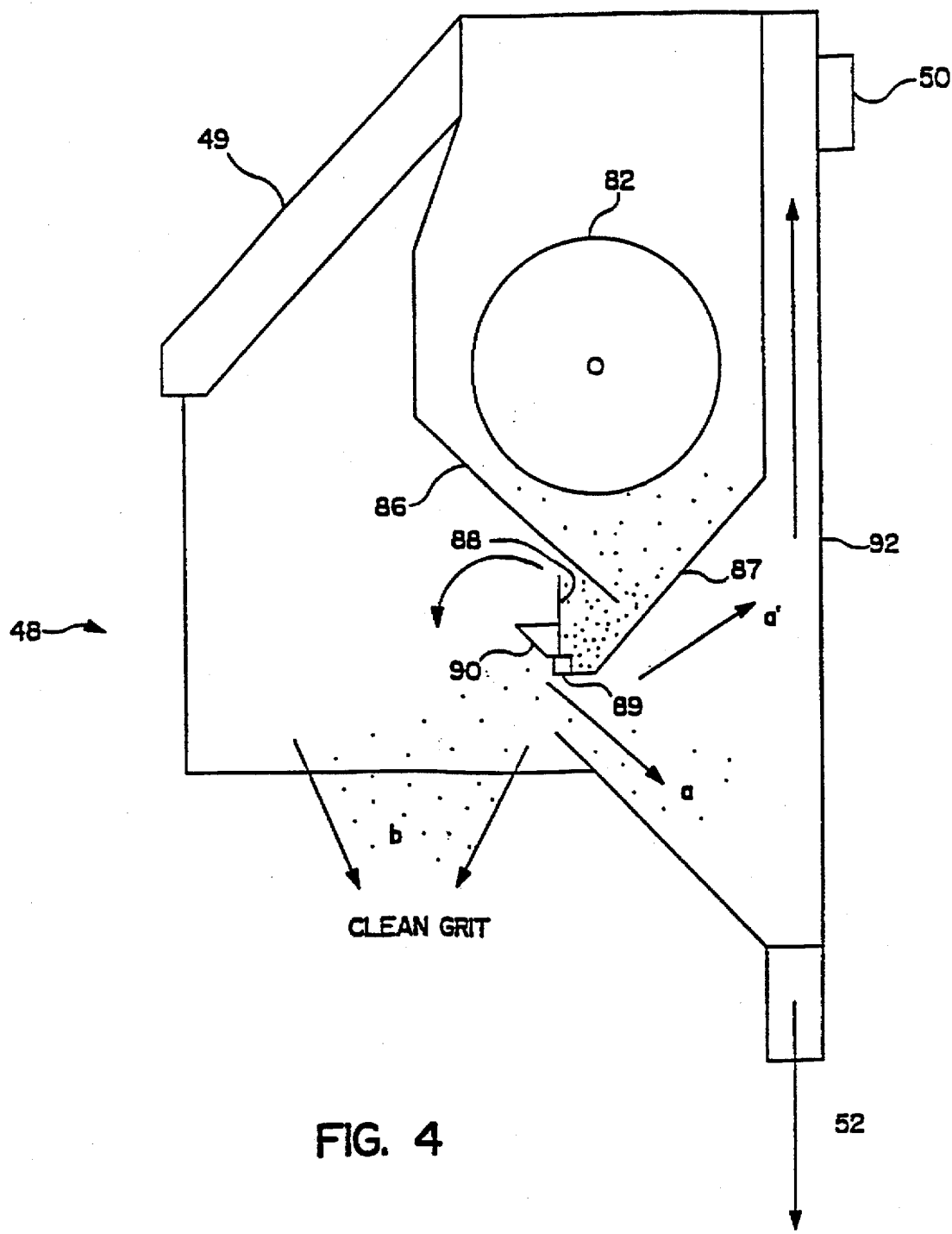
FIG. 4 is a font elevational view of the particle separator.

FIG. 4 shows the particle separator 48, which constitutes the third and final classification phase. Upon travel through the triple screening system 42, particles not contained are distributed evenly towards the accumulating plates 86, 87 contained in the housing 92 of the particle separator 48, due to the effect of the external and uppermost spiral member 68 which lies in close proximity thereto. At this point in the process the recovered particles may still comprise heavy particles, along with smaller particles and dust intermixed with abrasive. Upon particles impinging on accumulating plates 86 and 87 the particles comprising debris and abrasives will rest thereon. A support rod 88 is attached to collecting plate 87 by a hinge 89. Support rod 88 has a weight 90 mounted thereon. When a considerable amount of particles have accumulated between plates 86, 87 and rod 88, a force is exerted on rod 88. When the weight of the particles accumulated exceeds the value of weight 90, the rod 88 will swing open, creating a curtain of air flow, thereby causing particles to flow down towards the bottom of the housing 92. At this point, the negative pressure in the housing due to blower 20 (not shown) will cause debris to travel in direction a and abrasive to travel in direction b. At this point, a fourth and final airwash takes place as any remaining dust mixer with the debris is then separated therefrom and routed in the direction of a' to outlet 50 as a result of the pull from the dust collector 16. The separated debris will then travel through chute 52 to a storage drum, and the cleaned abrasive may be routed to the storage hopper 12 (FIG. 1A) or be contained in a drum for later use.

Thus, the incoming particles, having undergone four stages of airwashing and three stages of particle classification, comprise only abrasive particles after traveling through the particle separator 48. The abrasive recovered is now uncontaminated and safe for reuse in the blasting process. Foreign matter such as trash, debris and dust, which was recovered with the abrasive, are each safely disposed of and no longer present a potential threat to the health of the user.

Figure 5A:
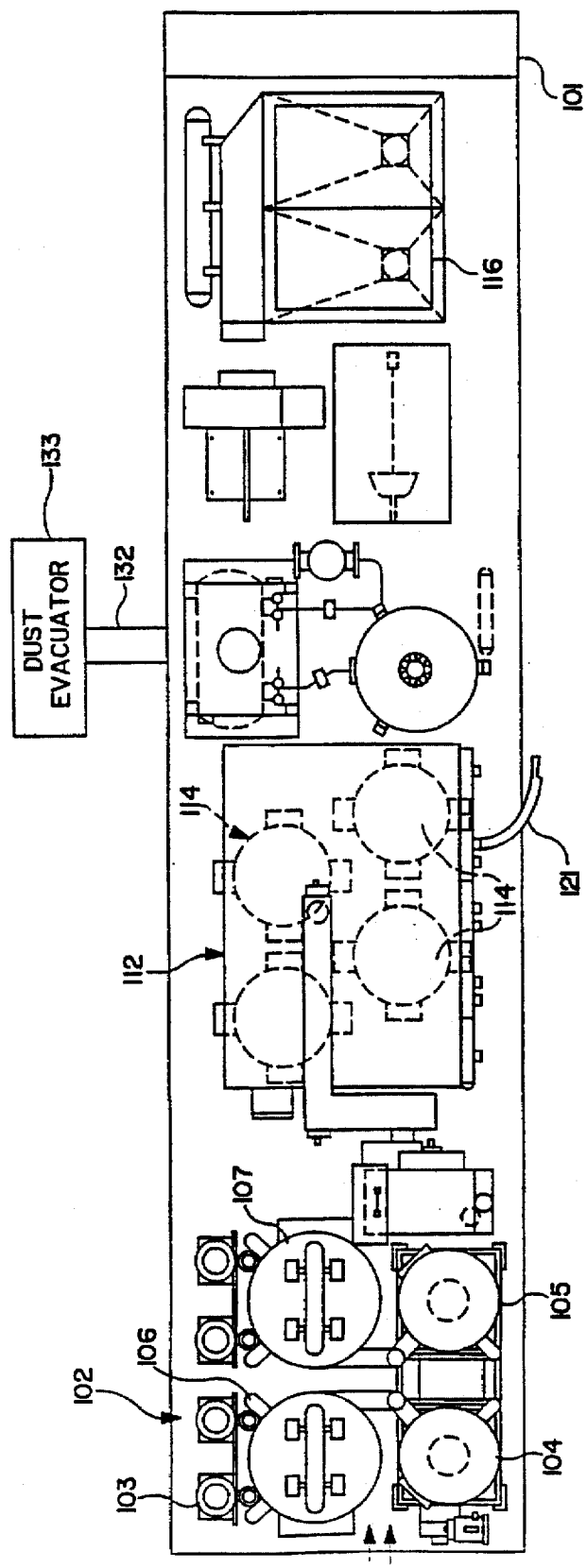
FIG. 5A is a front elevational view of the recyclable abrasive blasting system of the second embodiment.
Figure 5B:
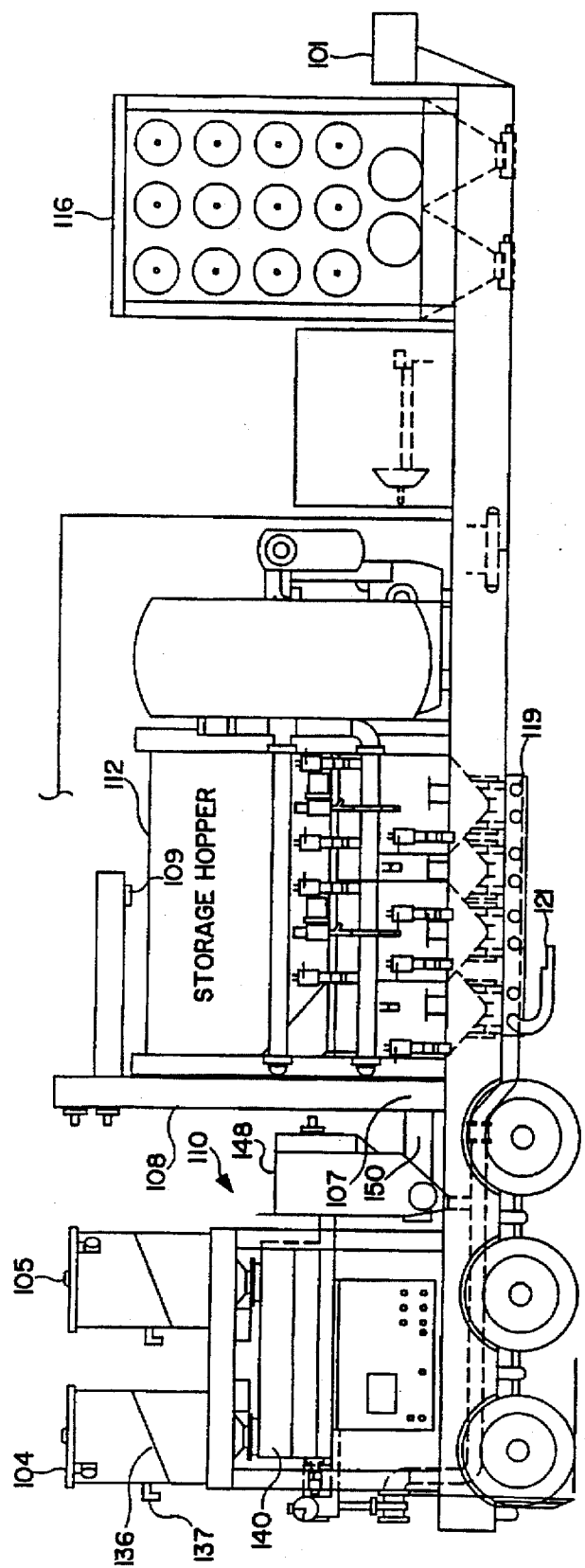
FIG. 5B is a plyiew of the recyclable abrasive blasting system of the second embodiment.

FIGS. 5A and 5B show an alternate and preferred embodiment of the present invention. Like the system of FIG. 1A and 1B, a trailer 101 supports the system elements. In this embodiment, there are two autodump tanks 104, 105 and two dust collectors 106, 107 which each operate in the same manner as autodump tank 4, and dust collector 6, respectively, described in detail in FIGS. 1A, 1B and 2. Vacuum assembly 102 operates in the same manner as does vacuum assembly 2 in the first embodiment, to maintain a constant vacuum in the system. Incoming particles such as trash, debris, dust and abrasive enter the tanks 104, 105 wherein separation of trash and debris is carried out through screen 136 and trash chute 137. Additionally, the removal of dust occurs through dust collectors 106, 107. Remaining particles are then metered through the autodump tanks 104, 105 in the same manner as described in FIG. 2, however particles are metered directly into the classifier 140 of classification system 110.

The classifier 140 operates in the same manner as classifier 40 described in detail in FIG. 3. After particles pass through the classifier 140, they continue to travel into particle separator 148. Particle separator 148 operates in the same manner as the particle separator 48 described in detail in FIG. 4 by using a blower 130 (not shown) to separate debris and dust from abrasive. Debris and heavy particle are discharged through chute 152, and dust goes to dust collector 116. Dust collector 116 operates to remove dust in the classifier 140 and particle separator 148, in the same manner as previously described in FIG. 2. Outlet 150 from particle separator 148 sends the cleaned abrasive into an inlet 107 of bucket elevator 108, which sends the abrasive via outlet 109 to storage hopper 112 and ultimately to the blast pots 114.

Located at the base of blast pots 114 are inlets 119 for connecting blast hose assemblies 121 which serve to propel the abrasive toward a surface being cleaned. A compressed air drying system 123 enables blasting to take pace by supplying clean dry air to the blast pots 114. Also in this embodiment is a dust evacuator 130 which connects with the dust collectors 106, 107, 116 such that dust accumulating therein can be evacuated therefrom and dispelled via hose 132 to a dust evacuator 133 at a location external to the system.

The external evacuation of dust protects the environment, the operator, and the surface being cleaned from contamination and re-contamination. As known in the art, other suitable transport methods may be used as an alternative to dust evacuator 133, including, for example, augers, closed conveyor systems, vacuum systems, pneumatic systems and the like.

Figure 6A:
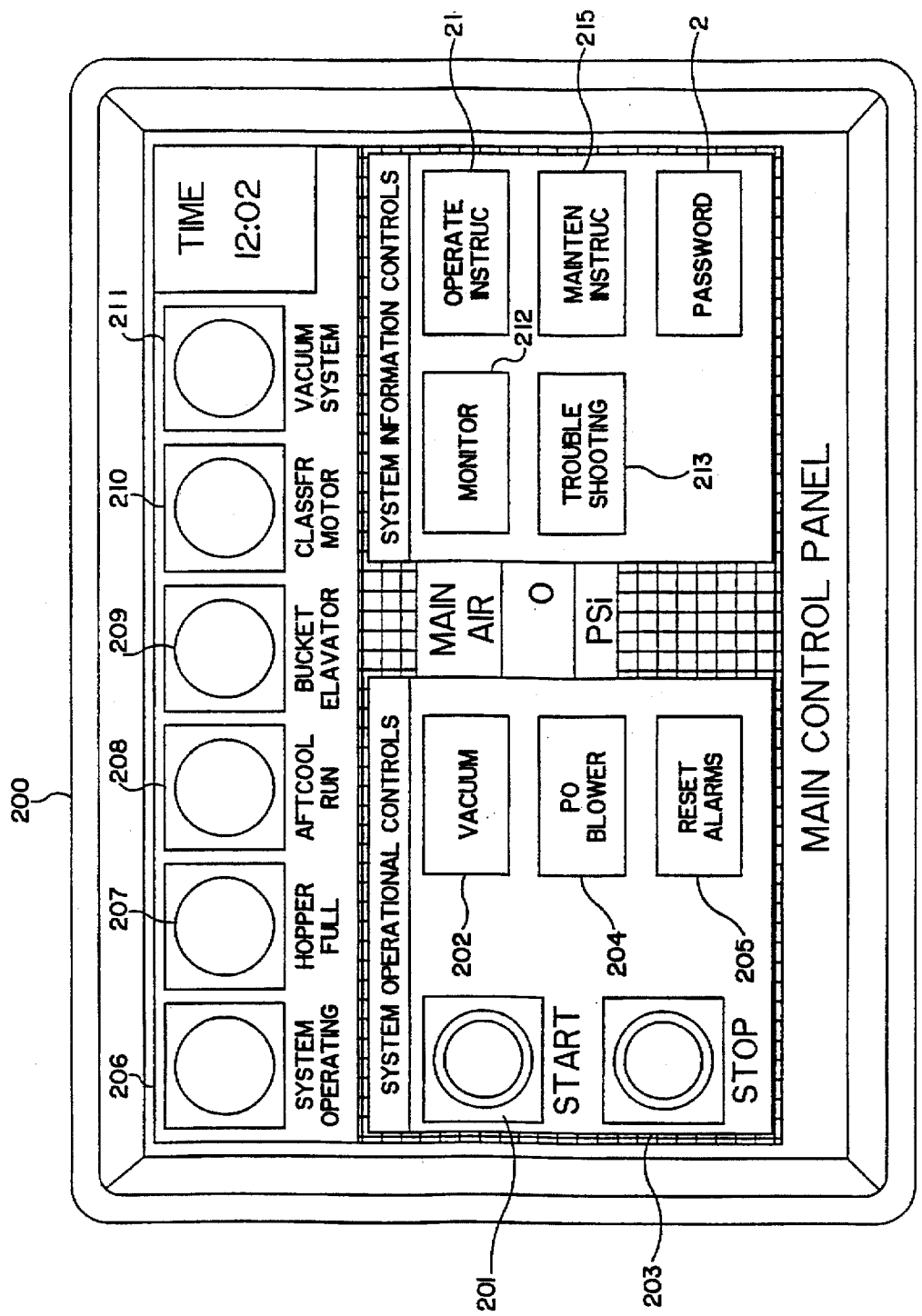
FIG. 6A is a view of the main control panel which is a which activates and monitors system operation.

FIG. 6A is a view of the main control panel 200 which is a computerized touchscreen capable of activating and monitoring system operation. Main control panel 200 is located just below the classifier 40, 140. A programmable controller (not shown) is located in the main control panel 200 which allows the user to monitor the system. Start square, 201 shown on the screen allows the user to interface with the blast pots 14, 114 and blast hose assemblies 21, 121. By merely touching that square on the screen, the user may activate the blasting process. By next touching the vacuum square 202 on the control panel, the user will interface with the vacuum assembly 2 or 102 thereby activating it, which will cause particles resulting from the blasting process, to be vacuumed into the system for classification and separation. By touching the stop square 203, the user can interface with the blasting elements, such as the blast pots 14 or 114 and blast hose assemblies 21 or 121, as well as with the vacuum assembly 2 or 102, so as to deactivate the blasting process, the vacuuming process and the classification/separation process in the system. However, classification and transfer of abrasive to the storage hopper will continue for eight minutes after this square has been touched by the user. Other operational control squares include a square 204 for activating a blower control screen whereby the user can monitor and control the blower, and a square for resetting alarm states 205. This square 205 which enables the user to eliminate the indication of alarm states shown on the screen after a problem has been corrected, if such alarm states have not been automatically corrected.

Across the top of the main control panel 200 there are a series of operating indicators 206–211, which inform the user of system status. Indicator 206 will be continuously illuminated when the system is operating. Indicator 207 will blink when the storage hopper 12, 112 becomes filled, which in turn will deactivate vacuum assembly 2, 102. Indicator 208 when illuminated indicates that an aftercooler fan (not shown) which is part of the compressed air drying system 23, 123 is cooling the blasting air. Indicator 209 is continuously illuminated while the bucket elevator 8, 108 is operating; which occurs also upon activation of the vacuum assembly 2, 102. Indicator 210 will also be illuminated upon activation of the vacuum assembly 2, 102, which indicates that the autodump tank 4, 104, 105 and classification system 10, 110 are operating. Lastly, indicator 211 will be illuminated upon activation of vacuum assembly 2, 102 to indicate that the vacuums are functioning.

Informational controls located on the main control panel 200 are squares 212–216 each of which allows the user to access information regarding operation of the system, current state of operation and maintenance of the system. Square 212 allows the user to access a main monitoring screen 400 (FIG. 6C-1). The main monitoring screen 400 allows the user to access a number of other screens, each of which is representative of the current operating state of a particular system element. The main monitoring screen 400 and those which can be accessed thereby, will be shown and described in greater detail in FIG. 6C. Square 213, the troubleshooting indicator which will blink in the event of system element malfunctioning. Touching this square allows the user to access a description of the malfunction and possible remedies. Square 214, allows the user to access operational instructions and square 215 allows the user to access maintenance instructions. Lastly, square 216 allows the user to access panels which are restricted only to certain personnel.

Figure 6B:
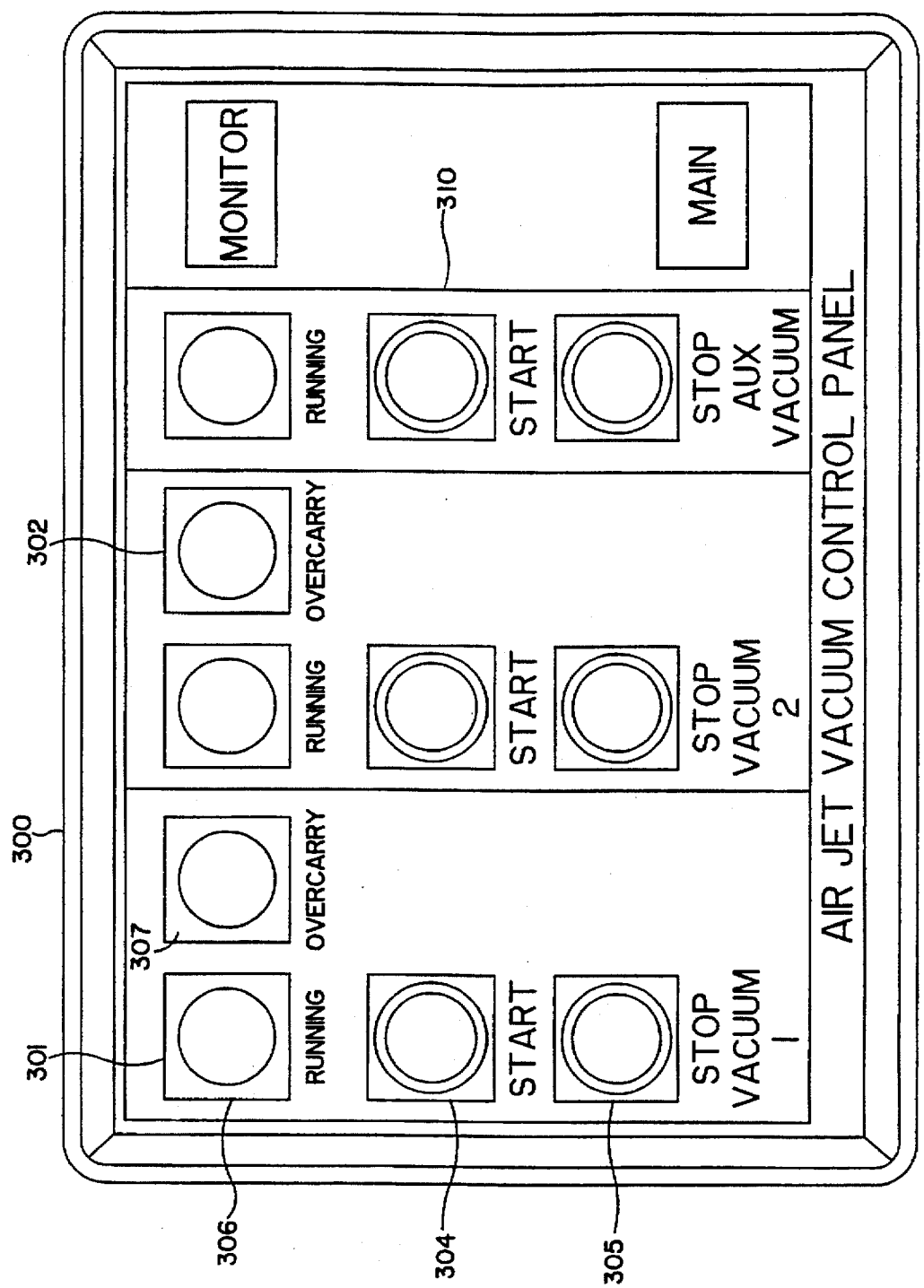
FIG. 6B is a view of the vacuum assembly control panel which is a touchscreen, which controls the operation of system vacuums.
Figures 1, 6C:
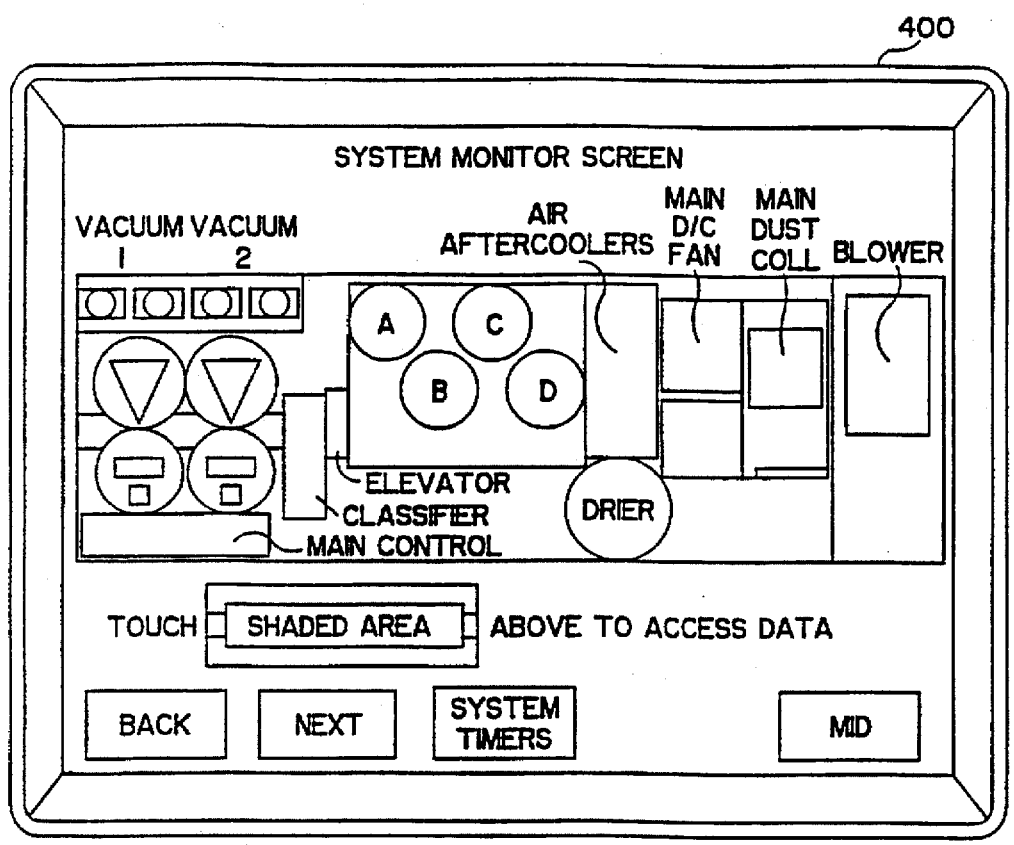
FIG. 6C-1 is a view of the system monitoring touchscreen and the other touchscreens which are accessible via the system monitoring touchscreen.
Figures 2, 6C:
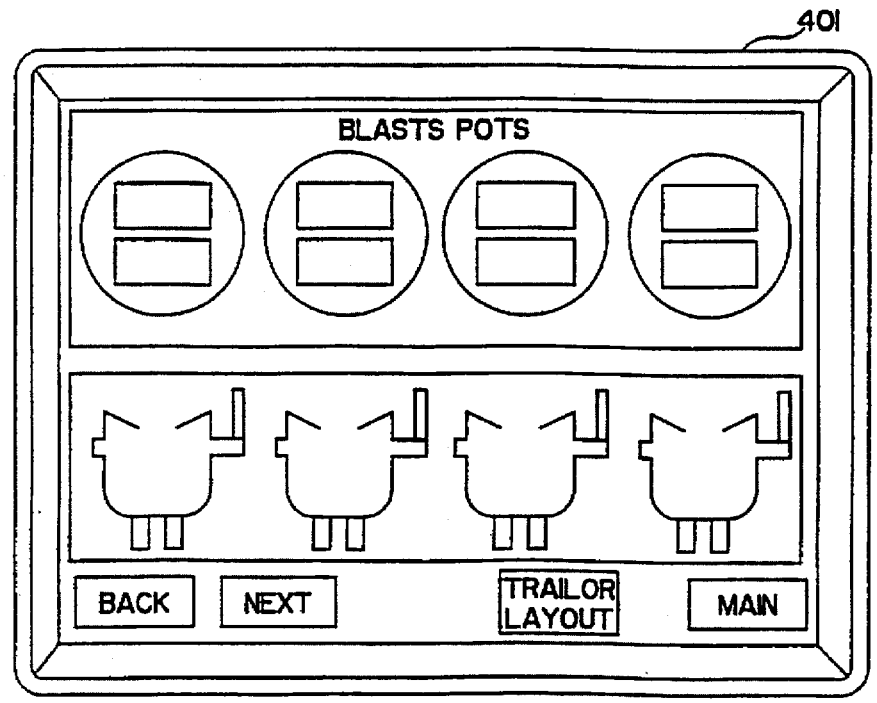
Figures 3, 6C:
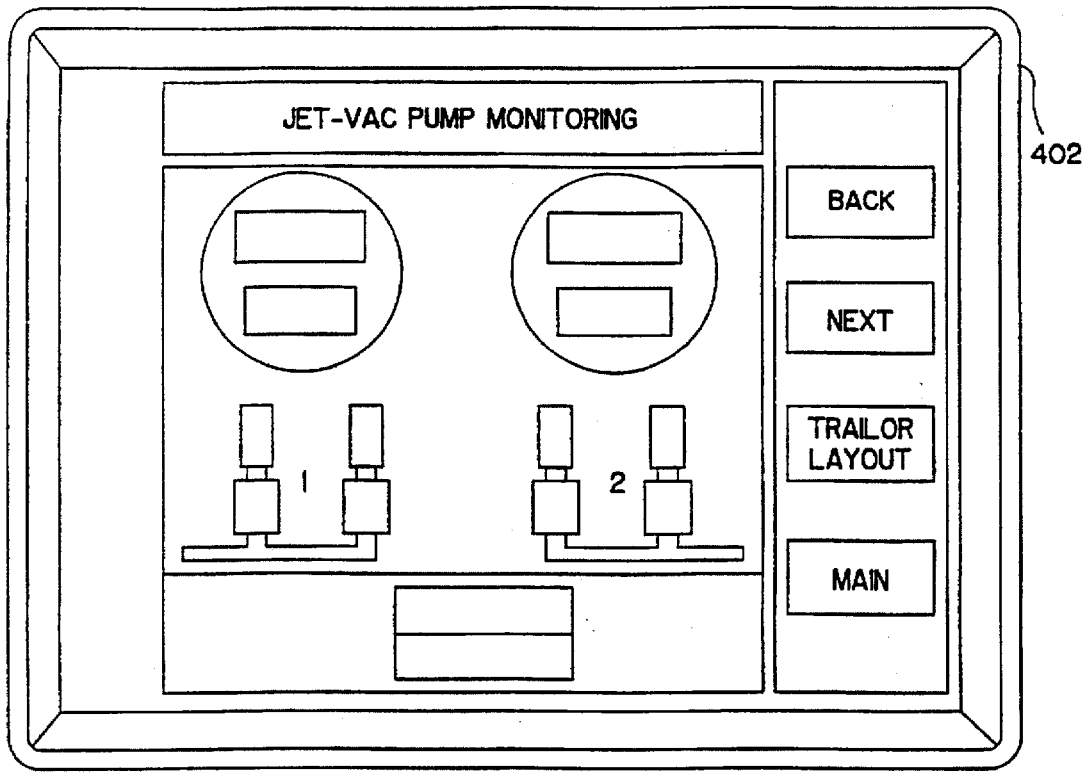
Figures 4, 6C:
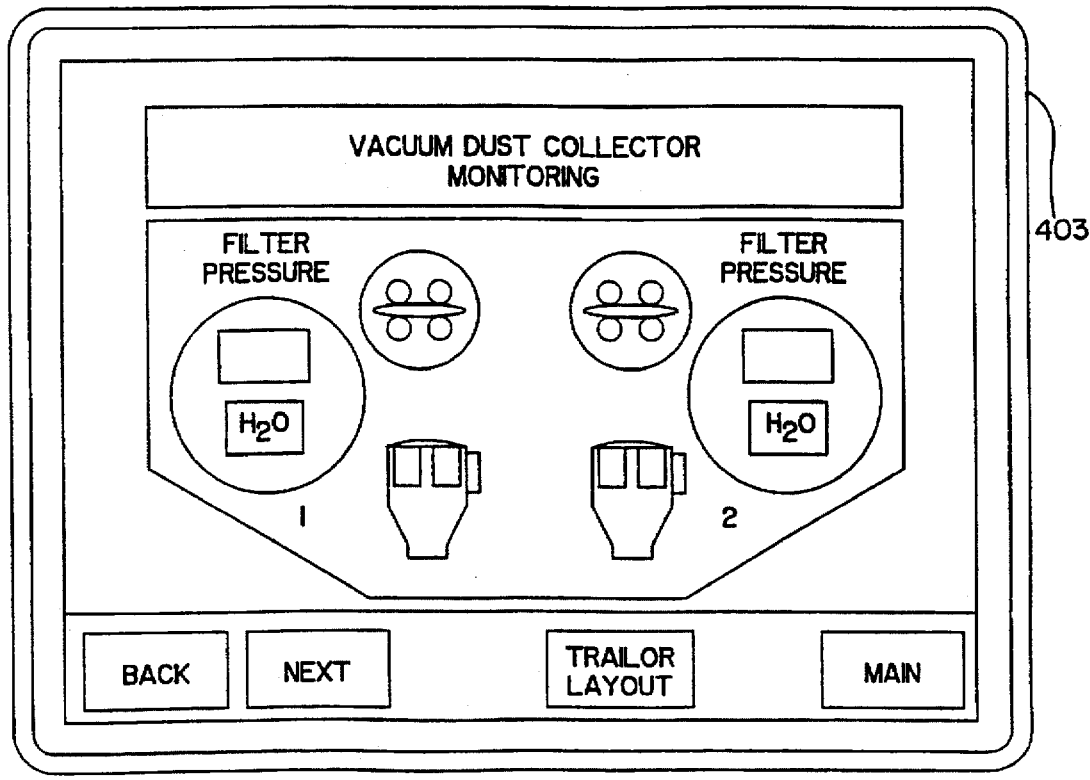

FIG. 6B is a view of the vacuum assembly control panel 300 which is a touchscreen which controls the operation of the vacuum assembly 102. Vacuums, 103 making up the elements in the vacuum assembly 2, 102 are represented by screen portions 301 and 302. Both portions have a start square 304 and a stop square 305 along with a running square 306 and an overcarry square 307. Each start square, 304 initiates running of a vacuum in the vacuum assembly 2, 102 as well as initiation of the autodump tank 4, 104 and classification system 10, 110. Both stop squares 305 will deactivate the vacuums, autodump tank, and classification system, however the autodump tank and classification system will continue operating for 8–10 minutes thereafter, until cleaned abrasive is transferred to the storage hopper 12, 112. Running square 306 will be illuminated when the vacuum associated therewith, has been activated. This square will not be illuminated should the vacuum be turned off or disabled. The Overcarry square 307 will blink when a high indicator sensor in the autodump tank 4, 104 senses that the particles therein have exceeded a certain level. The vacuum associated with this square will be temporarily inactive until the problem has been corrected by the particle having moved further through the chamber 22. If within four minutes no movement of particles has occurred therethrough, a malfunction message will be displayed and the system will shut down. An auxiliary vacuum 310 has a start, stop and running square also. This vacuum may be used as a back-up element.

Figures 5, 6C:
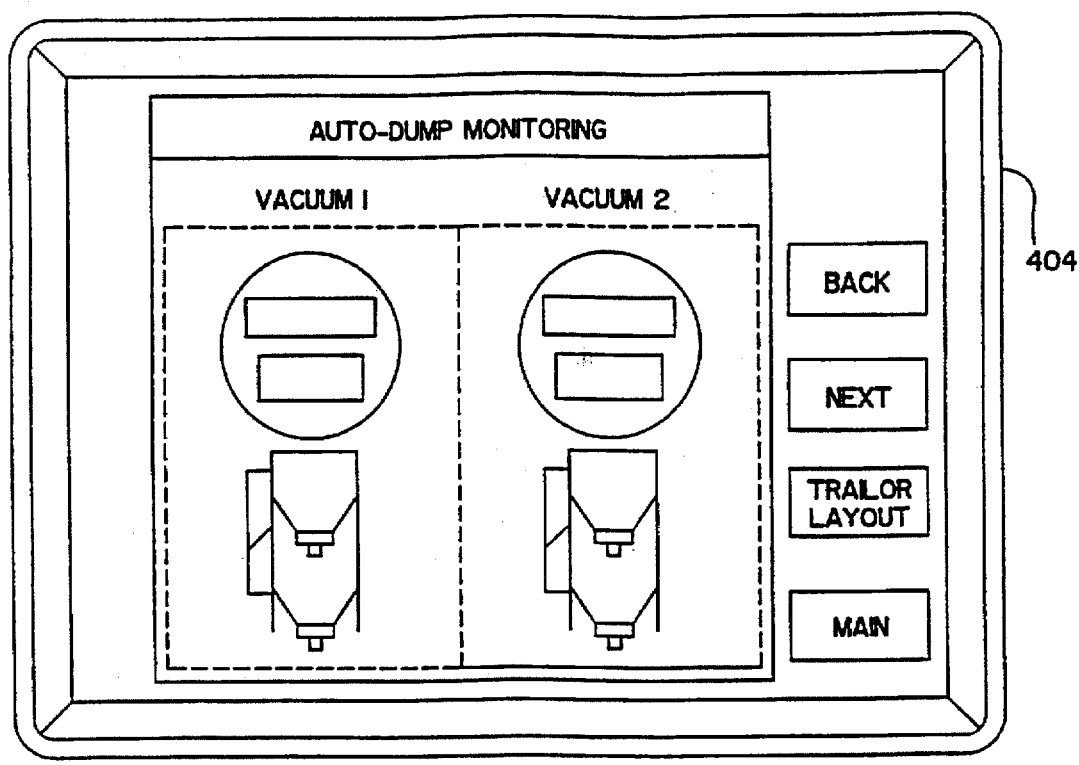
Figures 6, 6C:
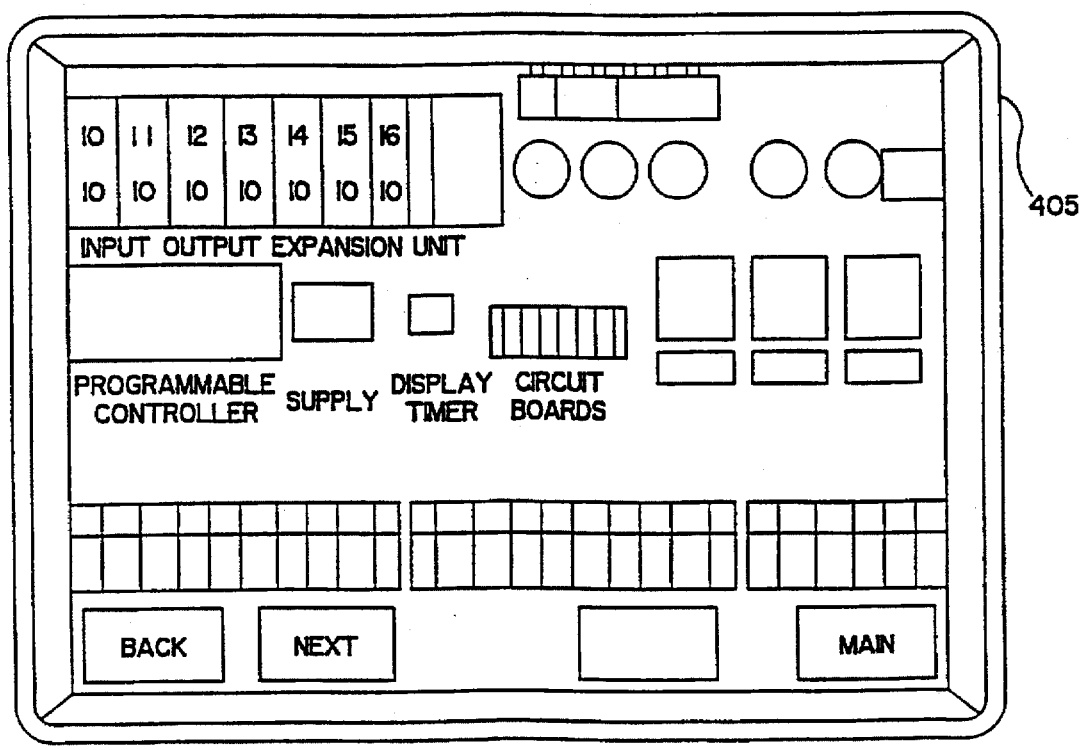
Figures 6, 6C, 7:
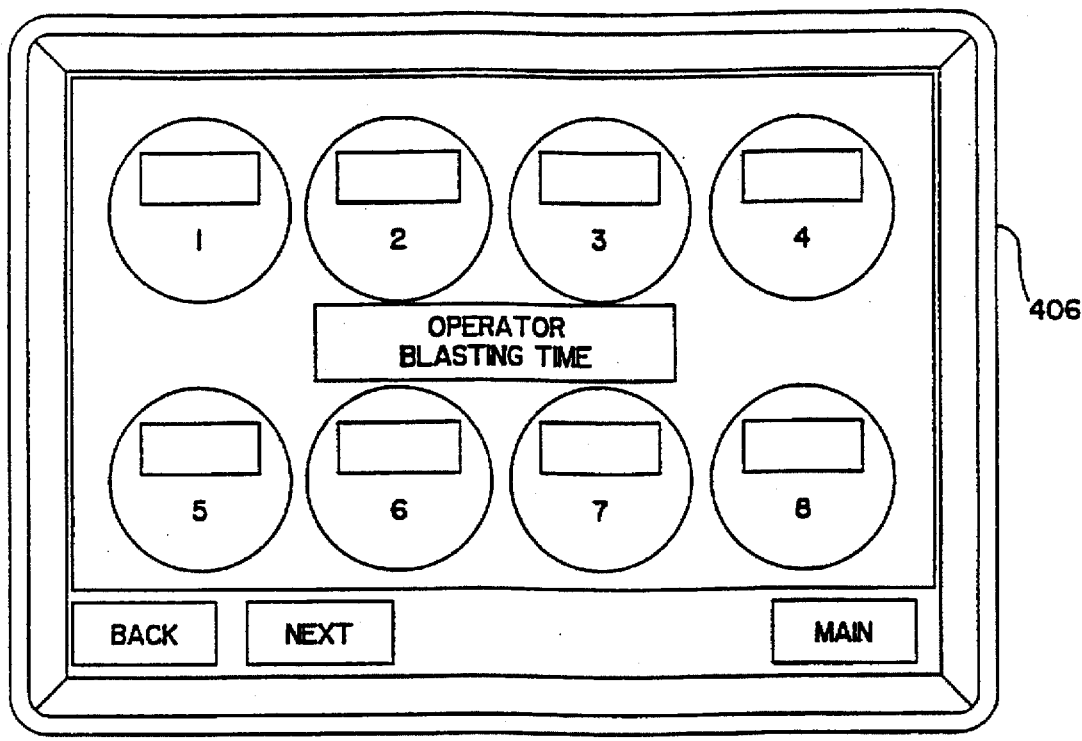
Figures 6, 6C, 7, 8:
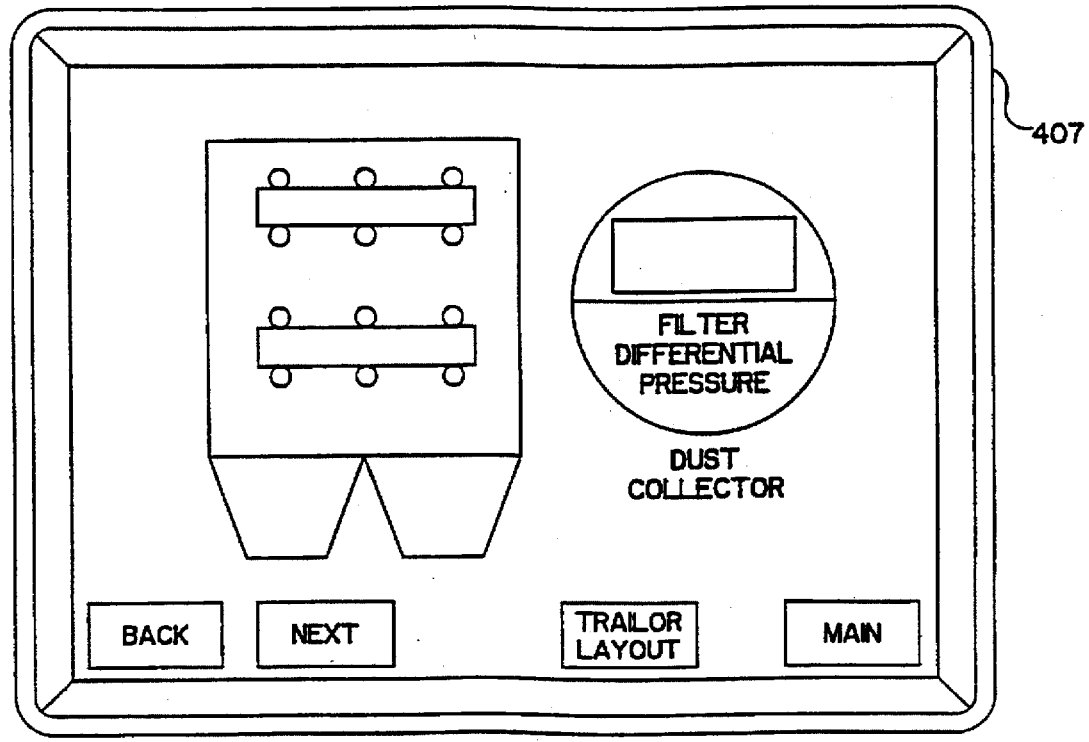
Figures 6, 6C, 7, 8, 9:
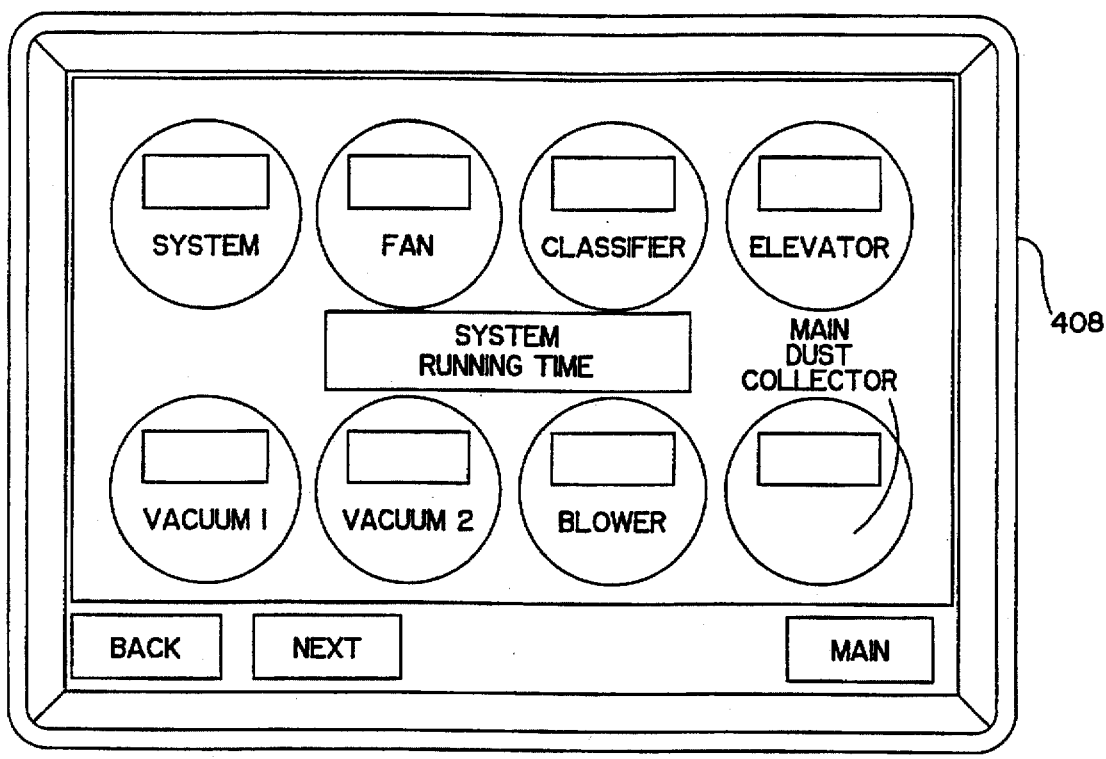

FIG. 6C-1 is a view of the system monitoring screen 400 and FIGS. 6C-2 through 6C-9 are veiws of the other touchscreens which are accessible via the system monitoring touchscreen. Each of the screens 401–408 which are accessible through the system monitoring screen 400 enable the user to monitor system elements. FIG. 6C-1 shows how the screen 400 depicts the exact manner in which the elements are positioned on the trailer 1, 101. Any of the elements may be depicted in further detail by merely touching that component on the system monitoring screen 400. FIG. 6C-2 shows how screen 401 represents the blast pots 14, 114. FIG. 6C-3 shows how screen 403 and represents vacuum assembly 2, 102. FIG. 6C-4 shows how screen 403 represents vacuum dust collector 6 or 106, 107. FIG. 6C-5 shows how screen 404 represents vacuum dust collector 4, or 104, 105. FIG. 6C-6 shows how screen 405 represents what electrical components should be on as your system is operating. FIG. 6C-7 shows how screen 406 represents the total blasting time for the outlets 19, 119 on the trailer. FIG. 6C-8 shows how screen 407 represents the operation of the dust collector 16, 116. FIG. 6C-9 shows how screen 408 represents the total operating time for the individual elements on the trailer.

With each of the aforementioned screens, each individual system element may be monitored. With respect to autodump tank 4, or 104, 105 a capacitance sensor may be employed to detect the level of particles therein. With respect to the vacuum assembly 2, 102 and dust collectors 6, 16, or 106, 107, 116 differential pressure sensors may be employed to detect a malfunction associated therewith. Lastly, any malfunctioning of the blast pots 4, 14 may be detected by a positive pressure transducer. However, with respect to the aforementioned elements other sensors currently known in the prior art may be employed.

The above disclosed embodiments of the invention is the preferred embodiment, however it is to be understood that numerous changes in construction and arrangement as well as number of elements can be made by those skilled in the art. All of such changes are encompassed within the scope and spirit of the present invention.

We claim:

1. An environmentally cooperative method for operating a recyclable abrasive blasting system to blast abrasive against a surface to be cleaned, and receive particles comprising abrasive, debris and dust, so as to recover the abrasive which has been blasted against the surface during the cleaning thereof; said recyclable abrasive blasting system comprising an autodump tank including a plurality of chambers, a classifier, a particle separator, a storage container, a means for evacuating dust, a dust collector, a trash collector and a plurality of airwashing means; said method comprising the steps of:

a) providing the supply of clean abrasive in a storage container;

b) blasting the abrasive against a surface to be cleaned;

c) collecting the particles comprising abrasive, debris and dust into the autodump tank including the plurality of chambers wherein a negative pressure is maintained in at least one of said chambers at all times;

d) evenly distributing said particles; and, e) creating a curtain of particles wherein a partial vacuum applied to said curtain of particles separates the abrasive from the remaining dust and debris to yield a clean abrasive available for reuse.

2. The method of claim 1 wherein said step of collecting includes the step of separating the dust from the particles.

3. The method of claim 2 wherein said step of collecting further includes the step of separating the debris from the particles.

4. The method of claim 3 wherein said step of collecting further includes the step of metering the particles.

5. The method of claim 3 wherein said step of separating the debris comprises the step of screening the particles.

6. The method of claim 2 wherein said step of separating the dust from the particles comprises the step of airwashing the particles.

7. The method of claim 1 including the step of separating the dust from the particles after said step of collecting.

8. The method of claim 7 wherein said step of separating the dust from the particles comprises the step of airwashing the particles.

9. The method of claim 1 wherein said step of evenly distributing the particles includes the step of separating the debris from the particles.

10. The method of claim 9 wherein said step of evenly distributing the particles farther includes the step of separating the dust from the particles.

11. The method of claim 10 wherein said step of separating the dust from the particles comprises the step of airwashing the particles.

12. The method of claim 1 wherein said step of creating a curtain of particles includes the step of separating the dust from the debris.

13. The method of claim 12 wherein said step of separating the dust from the debris comprises the step of airwashing the particles.

14. An environmentally cooperative method for cleaning a surface with a recyclable abrasive blasting system, said system including, a blasting assembly;

an autodump tank having a plurality of chambers, each having an inlet for receiving particles, a screen for separating debris from said particles, an outlet for separating dust from said particles, and a plurality of valves for metering said particles which travel through said autodump tank, said valves activated in response to an actuator, to maintain a negative pressure in at least one of said chambers at all times;

a classifier having an inlet for receiving said particles, a first auger having a motor for imparting rotary motion thereto, a plurality of augers, wherein said plurality of augers concentrically surround said first auger in rotating cooperation therewith, wherein each of said plurality of augers comprises a screen having a spiral member attached thereto, whereby each of said spiral members effectuates an even distribution of particles in a housing of said classifier, a plurality of outlets for routing debris outside of said housing of said classifier;

a particle separator having means for receiving said particles from said classifier, a hingedly mounted rod for creating a curtain of particles from said particles, a blower for creating a partial vacuum for separating abrasive from debris in said curtain of particles, yielding a clean abrasive available for reuse, a dust collector for separating dust from debris, and a plurality of outlets for discharging debris and dust separately from said housing of said particle separator;

a storage container for receiving said clean abrasive from said particle separator, such that said abrasive may be reused in said blasting assembly;

means for cleaning and drying a fluid;

a dust collector;

a trash collector;

a dust evacuator; and, a monitor and central processing means; said method steps comprising:

a) providing a clean supply of clean abrasive in a storage container;

b) blasting said abrasive against a surface to be cleaned;

c) collecting particles comprising abrasive, debris and dust into said autodump tank including a plurality of chambers;

d) maintaining a negative pressure in at least one of said chambers at all times;

e) performing a first separation of the dust from said particles;

f) performing a first separation of the debris from said particles;

g) metering said particles;

h) performing a second separation process of the dust from said particles;

i) evenly distributing said particles;

j) performing a second separation of the debris from said particles;

k) performing a third separation of the dust from said particles;

l) creating in said separator a flowing curtain of particles from said particles;

m) applying a partial vacuum to said curtain of particles to separate the abrasive from any remaining debris and dust to yield a clean abrasive available for reuse;

n) performing a process of of the dust from the debris.

15. The method of claim 14 further including the step of using as a source of clean abrasive, the recycled clean abrasive from said step of applying a partial vacuum to said curtain of particles to separate the abrasive from any remaining debris and dust to yield a clean abrasive in said step of providing a supply of clean abrasive.

16. The method of claim 15 further including the step of evacuating the dust from said dust collector.

17. The method of claim 14 further including the step of disposing of all the debris in the trash collector.

18. The method of claim 14 wherein said steps of separating the dust from the particles comprises airwashing.

19. The method of claim 14 wherein said steps of separating the debris from the particles comprise the step of screening the particles.

20. The method of claim 14 further including the step of compressing and drying air, and using said air to propel the abrasive against said surface in said blasting step.

21. The method of claim 14 further including the step of using the central processing unit to monitor and control the mobile recyclable abrasive blasting system.

22. The method of claim 21 wherein the monitor is a touchscreen monitor, and further including the step of using the touchscreen monitor to monitor and control the mobile recyclable abrasive blasting system.

23. A method of cleaning a surface with a recyclable abrasive blasting system, said system including, a blasting assembly;

an autodump tank having a plurality of chambers, each having an inlet for receiving particles, a screen for separating debris from said particles, an outlet for separating dust from said particles, and a plurality of valves for metering said particles which travel through said autodump tank, said valves activated in response to an actuator to maintain a negative pressure in at least one of said chambers at all times;

a classifier having an inlet for receiving said particles, a first auger having a motor for imparting rotary motion thereto, a plurality of augers, wherein said plurality of augers concentrically surround said first auger in rotating cooperation therewith, wherein each of said plurality of augers comprises a screen having a spiral member attached thereto, whereby each of said screens separate debris from abrasive, and each of said spiral members effectuates an even distribution of particles in a housing of said classifier, a plurality of outlets for routing debris outside of said housing of said classifier;

a particle separator having accumulating plates for receiving said particles which have traveled from said classifier to said particle separator, a hingedly mounted rod, around which is disposed said accumulating plates, for creating a curtain of particles, a blower for creating a partial vacuum for separating abrasive from debris in said curtain of particles, yielding a clean abrasive available for reuse, a dust collector for separating dust from debris, and a plurality of outlets for discharging debris and dust separately from said housing of said particle separator;

and, a storage container for receiving said clean abrasive from said particle separator, such that said abrasive may be reused in said blasting assembly;

said method steps comprising:
        a) blasting abrasive against a surface to be cleaned whereby said blasting creates particles containing abrasive, debris and dust;
        b) collecting the particles into said autodump tank;
        c) classifying the particles in said classifier;
        d) separating the abrasive from the particles in said separator.

24. The method of claim 23 further including the step of using as a source of clean abrasive, the abrasive separated from the particles in said separator for blasting against a surface to be cleaned.

25. The method of claim 23 further including the step of compressing and drying air, and using said air to propel the abrasive against said surface prior to said blasting step.

26. The method of claim 23 further including the step of using the central processing unit to monitor and control the mobile recyclable abrasive blasting system.

27. The method of claim 26 wherein the monitor is a touchscreen monitor and further including the step of using the touchscreen monitor to monitor and control the mobile recyclable abrasive blasting system.

* * * * *